March 25, 1924.
J. L. BRUNTON ET AL
CONTROL MECHANISM FOR THE IGNITION LEVERS OF INTERNAL COMBUSTION ENGINES
Filed Nov. 3, 1923   3 Sheets-Sheet 3
1,488,313
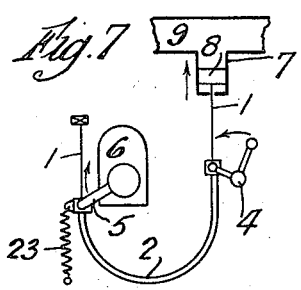
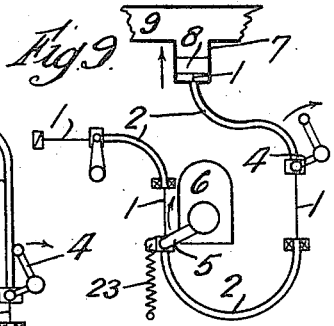
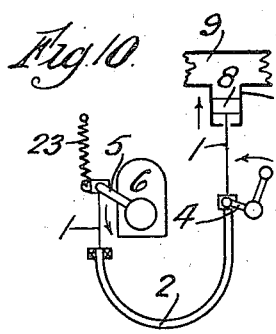
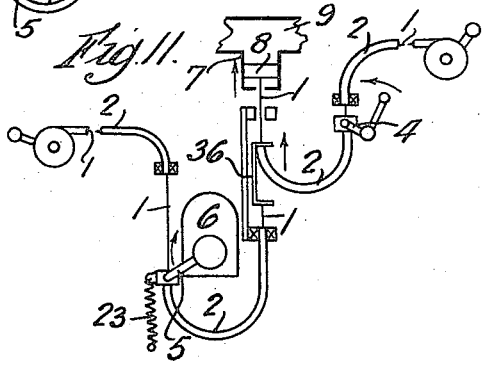
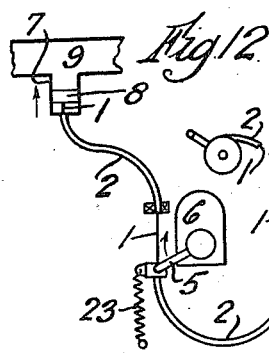
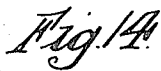
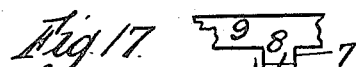

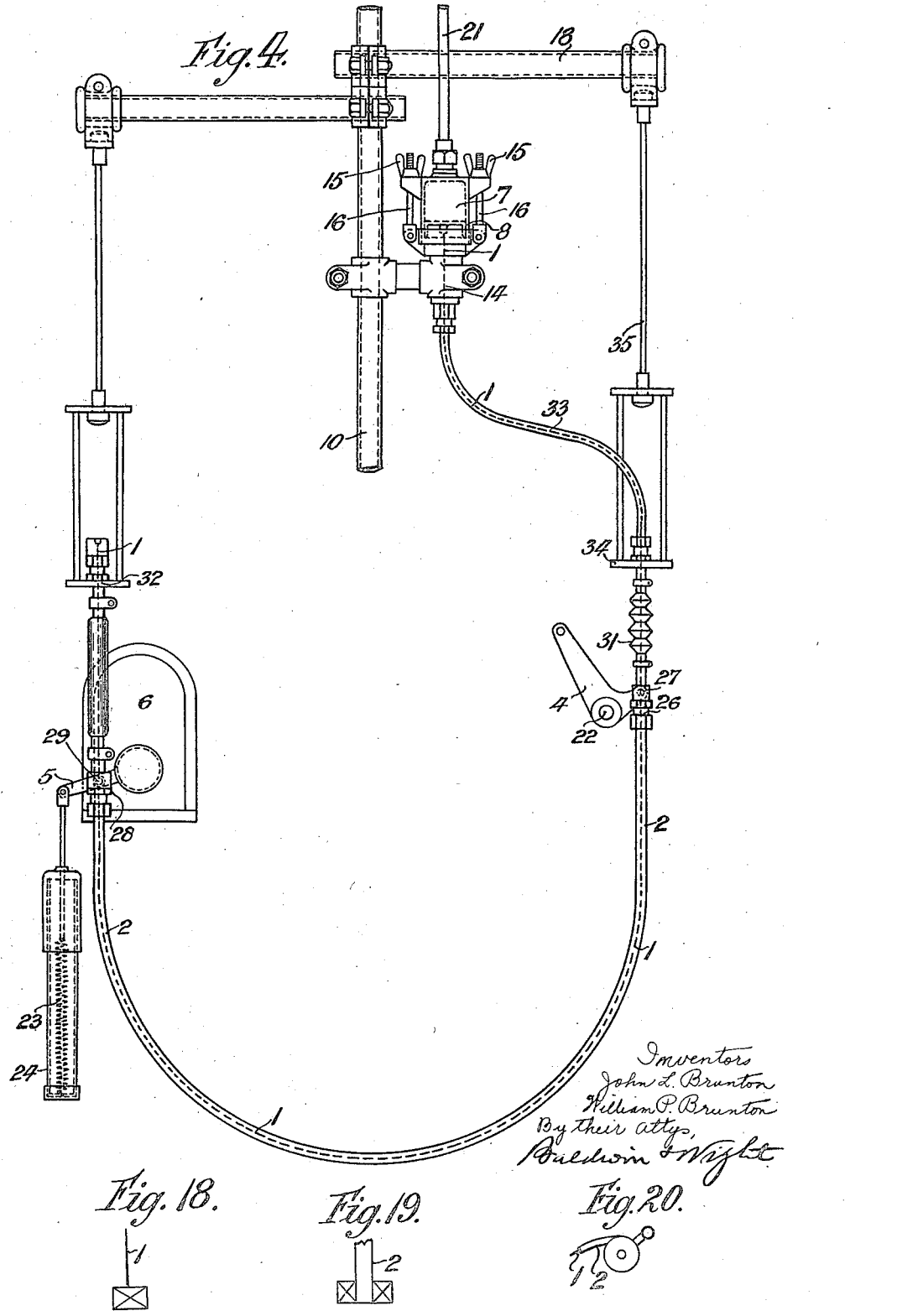

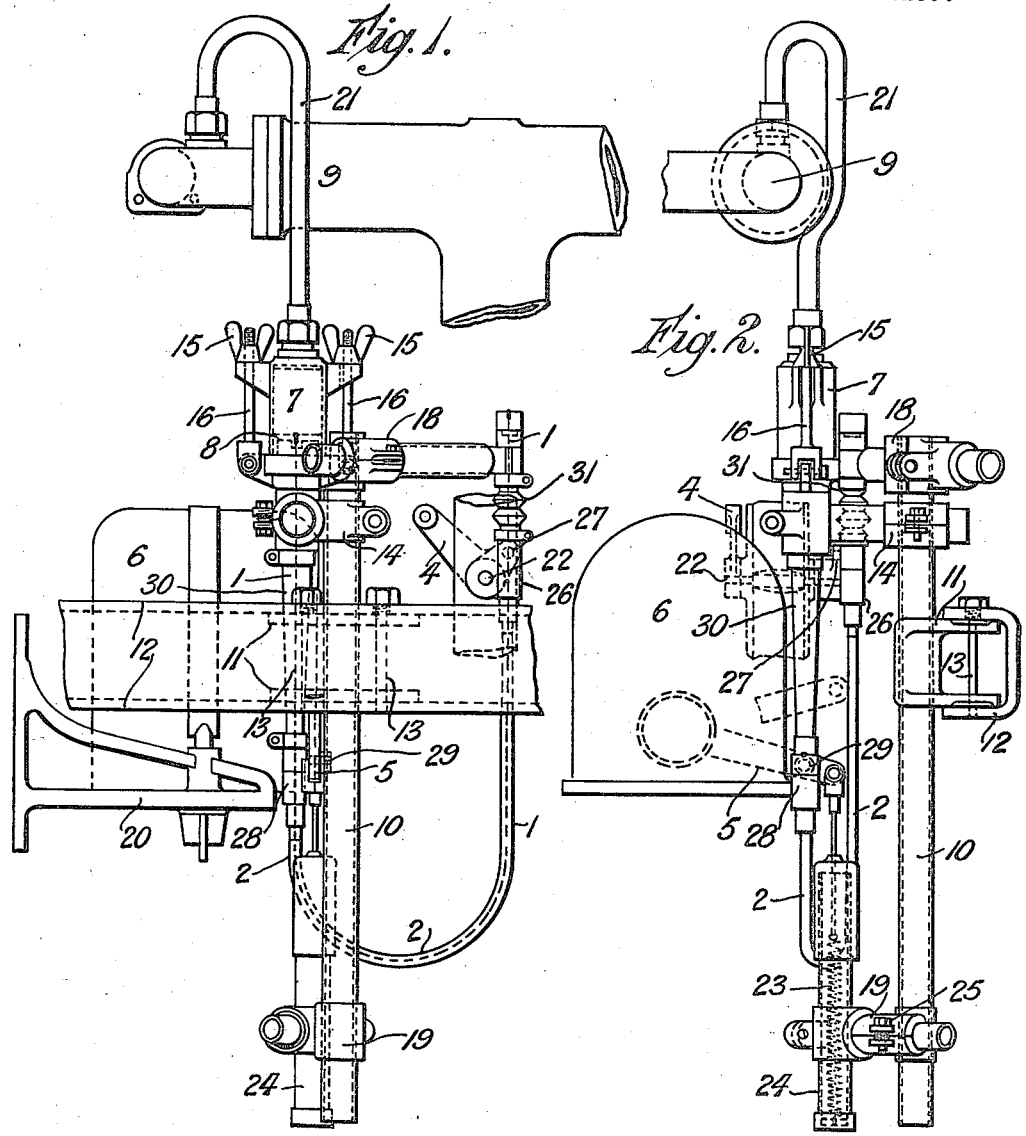
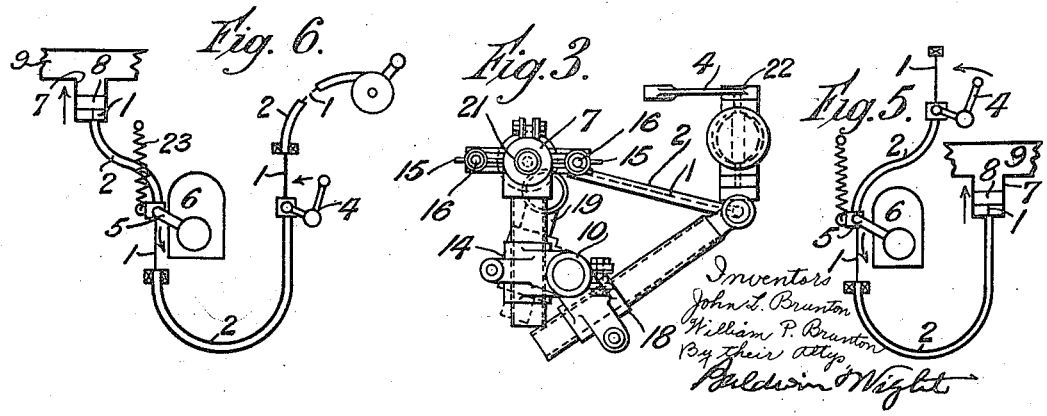

Patented Mar. 25, 1924.

1,488,313

UNITED STATES PATENT OFFICE.

JOHN LOCKHART BRUNTON AND WILLIAM PATON BRUNTON, OF LONDON, ENGLAND.

CONTROL MECHANISM FOR THE IGNITION LEVERS OF INTERNAL-COMBUSTION ENGINES.

Application filed November 3, 1923. Serial No. 672,593.

*To all whom it may concern:*

Be it known that we, JOHN LOCKHART BRUNTON and WILLIAM PATON BRUNTON, both subjects of the King of Great Britain, residing at London, England, have invented new and useful Improvements in Control Mechanism for the Ignition Levers of Internal-Combustion Engines, of which the following is a specification.

This invention relates to improved means for controlling the ignition lever of an internal combustion engine.

According to our invention we control the ignition lever of an internal combustion engine through the movements of a throttle lever, and a governor or a piston actuated by the suction in the induction pipe or manifold by connecting the ignition lever to the throttle lever and to the governor or piston by a wire and a flexible incompressible casing, in such a manner that when the governor is moved or the suction in the manifold increased by an increase in the engine speed, the ignition lever is advanced, and vice versa, and when the throttle valve is opened, the ignition lever is also advanced and vice versa.

In the accompanying drawings which illustrate the invention, Figure 1 is a side elevation, Figure 2 a front elevation and Figure 3 a part plan.

Figure 4 is a view showing a modification.

Figures 5, 6, 7, 8, 9, 10, 11, 12, 13, 14, 15, 16 and 17 are diagrams showing examples of alternative ways of coupling the parts shown in Figures 1 to 4, and Figures 18, 19 and 20 are detail diagrams.

Referring to Figures 1, 2 and 3, 10 is a tube on which the control mechanism is carried. The tube 10 has fast on it a bracket 11 which is secured to the side frame 12 of a vehicle by means of bolts 13. 14 is a bracket fast on the tube 10 and carrying a cylinder 7 which is held on to bracket 14 by wing nuts 15 screwing on bolts 16 pivoted to it. In the cylinder 7 is a piston 8. The tube 10 is also provided at the top and at the bottom with brackets 18 and 19 respectively. 6 is a magneto carried by a support 20. 9 is a manifold of an internal combustion engine and is connected by a tube 21 to the top of the cylinder 7. 4 is a lever pivoted at 22 and controlling the engine throttle valve (not shown). 5 is a lever on the magneto 6 for advancing and retarding the spark. The lever 5 is normally held in the retarded position by a spring 23, the lower end of which is connected to a sleeve 24 which can be adjustably clamped in position on the bracket 19 by a bolt 25. The ignition lever 5 is connected to the throttle lever 4 and the piston 8 in the following manner:—

1 is a wire cable anchored at one end to the bracket 18 and at the other end to the piston 8. The wire 1 passes through a flexible incompressible casing 2 one end of which is mounted in a block 26 pivoted at 27 to the throttle lever 4, while the other end of the casing 2 is mounted in a block 28 which is pivoted at 29 to the ignition lever 5. 30 and 31 are flexible covers adapted to enclose those parts of the wire 1 which are not enclosed in the casing 2 and keep them free from dust.

In operation, when it is desired to start the engine the throttle valve is only slightly opened by the lever 4 and the ignition lever 5 is in the retarded position. As soon as the engine starts suction is created in the manifold 9 which is conveyed by the tube 21 to the cylinder 7 with the result that the piston 8 is drawn upward. This has the effect of raising the looped portion of the casing 2, thereby raising that end of the casing 2 which is on the left hand side of Figure 1 and so raising and advancing the ignition lever 5. If now the throttle lever be further opened the effect on the ignition lever 5 will be twofold; firstly, the movement of the lever 4 will slide the casing 2 along the wire 1 so that that end of the casing which is on the left in Figure 1 will tend to raise and advance the ignition lever 5 and at the same time the effect of opening the throttle valve will be that there will be a decrease in the vacuum existing in the manifold 9 with the result that the piston 8 will drop to a greater or less extent, the effect of which will be to allow the looped part of the casing to fall and so to lower and retard the ignition lever 5. As the engine gathers speed the suction in the manifold 9 will be increased, thus raising the piston 8 and advancing the ignition lever 5. Conversely, if the engine slows the suction in the manifold 9 and cylinder 7 will fall and the ignition will be retarded.

Referring now to Figure 4, the general arrangement of the parts is the same except that the wire 1 and casing 2 are employed in a different manner to obtain the same result. In this figure it will be seen that the cylinder 7 is adjacent to the throttle lever 4 instead of being adjacent to the magneto 6. The wire 1 is connected at one end to the piston 8 and at the other to an anchorage 32. The wire 1 passes through a flexible incompressible casing 2 one end of which abuts against the throttle lever 4 and the other against the ignition lever 5, while between the throttle lever 4 and cylinder 7 there is a piece of outer casing 33 one end of which abuts against the bracket 14 while the other abuts against an anchorage 34 which is carried by a link 35 mounted or pivoted to the bracket 18.

In operation, if the throttle valve be opened by the lever 4, one end of the casing 2 is slidden along the wire 1 so that the other end pushes up and advances the ignition lever 5 while when the piston 8 is raised the looped part of the casing 2 will be raised thus compelling that end of the casing 2 which is on the left in the drawing to raise and advance the ignition lever 5.

It may be pointed out that the casing 33 merely acts as a guide for the wire 1 and might be made as a rigid tube.

Referring now to Figures 5 to 17, these show diagrammatically different ways in which the ignition lever 5 can be coupled up to the throttle lever 4 and to the piston 8 so as to obtain the same results as in Figures 1 to 4. In each of these diagrams where an end of the wire 1 is connected to a fixed anchorage it is indicated as in Figure 18, and where an end of the casing 2 is connected to a fixed anchorage it is indicated as in Figure 19, and where an end of the wire 1 is connected to an adjustable anchorage it is indicated as in Figure 20.

In Figure 5 when the throttle lever is moved to open the valve, the casing 2 is slidden along the wire 1 and when the piston 8 is drawn upwards tension is put upon the wire 1, the lower end of that part of the casing 2, connecting the throttle lever 4 to the ignition lever 5, is straightened out so that the lower part of the casing is forced downwards, thus advancing the ignition.

In Figure 6, when the throttle lever 4 is moved to open the valve, the casing 2 is moved so as to move the looped part of the casing downwards, thus drawing in the wire 1 which in turn straightens that part of the casing which connects the ignition lever to the cylinder 7, the lower part of this casing being thus forced downwards together with the ignition lever 5.

In Figure 7, when the throttle valve is opened by the lever 4, the casing 2 is slidden round the wire 1 and when the piston 8 is raised, the loop of the casing 2 is raised so that the left hand side of the casing is raised and advances the ignition lever 5.

In Figure 8, 36 represents a slide. When the lever 4 actuating the throttle valve is moved to open the valve, it moves upwards the casing 2, thus drawing in the wire 1, which latter has the effect of drawing up the looped part of the casing 2 connecting the cylinder 7 to the slide 36, so that this latter is moved upwards. The effect of this is to raise the wire 1 connected to the bottom of the slide 36 and to draw up the looped part of the casing which butts at one end against the ignition lever 5, so that the left hand side of the casing 2 is drawn upwards and the ignition lever 5 is advanced. When the piston 8 is raised, the looped part of the casing 2 of which one end is attached to the cylinder 7, is drawn upwards, thus raising the looped part of the casing 2 of which one end is connected to the ignition lever 5 in the same manner as occurs when the throttle lever 4 is actuated.

In Figure 9, when the throttle lever 4 is actuated the looped part of the casing 2 connecting it to the cylinder 7, is moved so as to draw in the wire 1. This has the effect of drawing up that part of the casing one end of which butts against the ignition lever 5 so that the ignition lever 5 is moved upwards. When the piston 8 is raised, the looped part of the casing, one end of which butts against the ignition lever 5, is raised, thus advancing the ignition lever 5. 20ª is a known device for adjusting the tension on the wire 1 by altering the position of the anchorage of the casing 2.

In Figure 10, when the lever 4 is moved to open the throttle valve, the looped part of the casing 2 is moved downwards, thus drawing the left hand end of the wire 1 together with the ignition lever 5 downwards, thus advancing the ignition. When the piston 8 is raised the casing 2 merely acts as a guide for the wire.

In Figure 11, when the lever 4 is moved to open the throttle valve the casing 2 is slidden along the wire, thus raising the slide 36, the effect of which is to raise and advance the ignition lever 5 as in Figure 8, and when the piston 8 is raised, the slide 36 is raised by the casing 2.

In Figure 12, when the lever 4 is moved to open the throttle valve, the casing 2 raises the ignition lever 5. When the piston 8 is raised, the looped part of the casing 2, one end of which abuts against the ignition lever 5, is raised; the casing 2, one end of which abuts against the cylinder 7, acts merely as a guide for the wire 1.

In Figure 13, when the lever 4 is moved to open the throttle valve, the looped part of the casing 2 connecting it to the adjustable anchorage is moved downwards, thus drawing in the wire 1, the effect of which is to raise the slide 36 as in Figure 8, the remaining operations acting as in Figure 8.

In Figure 14, when the lever 4 is moved to open the throttle valve, the casing 2 is slidden along the wire 1, thus raising and advancing the ignition lever 5, and when the piston is raised, the looped part of the casing 2 is raised (together with the ignition lever 5).

In Figure 15, when the lever 4 is moved to open the throttle valve, the looped part of the casing 2, together with the ignition lever 5, is raised. When the piston 8 is raised, the looped part of the casing 2 is raised.

In Figure 16, when the lever 4 is moved to open the throttle valve, the casing 2 is slidden along the wire 1 to advance the ignition lever 5. When the piston 8 is raised, the looped part of the casing 2 is raised.

In Figure 17, when the lever 4 is moved to open the throttle valve, the casing 2 is slidden along the wire 1 as in Figure 16. When the piston 8 is raised, the looped part of the casing 2 is raised so that the left hand part of the casing 2, and the ignition lever 5, are raised, the casing 2, which connects the cylinder 7 to the fixed anchorage, serving merely as a guide.

What we claim is:—

1. In an internal combustion engine having a throttle operating device, a manifold, and an ignition controlling device; a member operated by the suction in the manifold, and means including a wire and a looped flexible casing therefor connecting the member and the throttle operating device to the ignition controlling device so that the latter is controlled by the movements of either said member or the throttle operating device, one of said movements being transmitted by the wire and the other by the casing.

2. In an internal combustion engine having a throttle operating device, a manifold, and an ignition controlling device; a member operated by the suction in the manifold, a wire connected at one end to said member and to a fixed anchorage, a flexible looped casing for said wire connected at one end to the throttle operating device, and at the other end to the ignition controlling device, whereby the latter is operated either by the movement of said member or by the movement of the throttle operating device.

3. In an internal combustion engine having a throttle lever, a manifold, and an ignition lever; a piston operated by the suction in the manifold, and means including a wire and a flexible looped casing therefor connecting the piston and the throttle lever to the ignition lever so that the latter is controlled by the movements of either the piston or the throttle lever, one of said movements being transmitted by the wire and the other by the casing.

4. In an internal combustion engine having a throttle lever, a manifold, and an ignition lever; a piston operated by the suction in the manifold, a wire connected at one end to said piston and to a fixed anchorage, a flexible looped casing for said wire connected at one end to the throttle lever and at the other end to the ignition lever, so that the latter is controlled by the movements of either the piston or the throttle lever.

In testimony that we claim the foregoing as our invention, we have signed our names this 19th day of October 1923.

JOHN LOCKHART BRUNTON.
WILLIAM PATON BRUNTON.